United States Patent [19]

Fröhlich et al.

[11] 4,202,183
[45] May 13, 1980

[54] GEAR COUPLING

[75] Inventors: Michael Fröhlich, Kirchheim-Teck; Walter Stähle, Uhingen, both of Fed. Rep. of Germany

[73] Assignee: Robert Bosch GmbH, Stuttgart, Fed. Rep. of Germany

[21] Appl. No.: 828,226

[22] Filed: Aug. 26, 1977

[30] Foreign Application Priority Data

Sep. 29, 1976 [DE] Fed. Rep. of Germany ....... 2643784

[51] Int. Cl.² .............................................. F16C 3/00
[52] U.S. Cl. ..................... 64/1 C; 269/239; 81/4; 64/9 R
[58] Field of Search .............. 269/239; 64/1 C, 9 R, 64/31, 14; 403/231, 354, 359; 81/4; 51/217 T, 217 R

[56] References Cited

U.S. PATENT DOCUMENTS

| 292,599 | 1/1884 | Tasker | 269/239 |
|---|---|---|---|
| 481,238 | 8/1892 | Muehlmatt | 81/4 |
| 1,555,774 | 9/1925 | Thompson | 269/239 |
| 3,874,194 | 4/1975 | Filepp | 64/14 |

FOREIGN PATENT DOCUMENTS

| 1035417 | 7/1958 | Fed. Rep. of Germany | 64/9 |
|---|---|---|---|
| 86048 | of 1920 | Switzerland | 51/217 R |
| 665974 | 2/1952 | United Kingdom | 403/231 |

*Primary Examiner*—Samuel Scott
*Assistant Examiner*—G. Anderson
*Attorney, Agent, or Firm*—Michael J. Striker

[57] ABSTRACT

A gear coupling for connecting for instance a control mechanism with a motor is provided at its driven end with a disk which on its face has two segmental clamp jaws which are journalled at two diametrically opposed pivot points and by means of tension screws engaging the jaws between the pivot points can be forced in a substantially radial direction against connecting pieces of the driven part. The clamp jaws are particularly resistant to bending forces and the bending force moment during adjustment is very small.

4 Claims, 3 Drawing Figures

GEAR COUPLING

BACKGROUND OF THE INVENTION

Gear couplings in which two ring gears are provided of which one connects with a motor or similar part and the other with the driven part are known. It is also known to use a driving bushing with an inner tooth gear which meshes with the beveled exterior tooth structure of the ring gears.

The gear couplings have the advantage that it is possible in this manner to connect axles which are not perfectly aligned. These couplings have, however, the shortcoming that they are not well adapted to be adjusted to the specific parts to be connected.

SUMMARY OF THE INVENTION

The gear couplings of the invention comprises a drive bushing provided with internal gear teeth, two ring gears having external convex gear teeth meshing with said internal gear teeth of the bushing, one of the ring gears being adapted for connection to a motor, a driven disk, the other of the ring gears being secured in non-rotational manner to the driven disk, means for connecting the disk with a driven part, a plurality of clamp jaws arranged for rotation on the disk and tensioning means provided on the jaws between their pivot points for forcing the clamp jaws against the connecting means and thereby against the driven part.

The principal advantages of the coupling of the present invention against the prior art are these:

The clamping area for connecting with the driven part is adjustable. The clamp jaws have a particularly good resistance against bending and the bending moment exerted upon the clamp jaws by a decrease of the length of the lever which adjusts the pressure on the jaws by the action of tension screws upon the clamp claws of the driven part is extremely small. In addition the rotational moment of the forces is distributed through a plurality of tension screws.

DESCRIPTION OF THE PREFERRED EMBODIMENT

Figure 1:
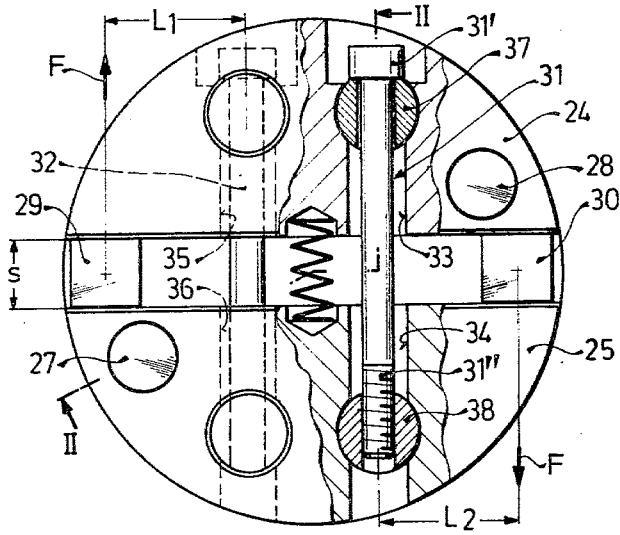
FIG. 1 shows a bevel gear coupling in a front view, partly in section.
Figure 2:
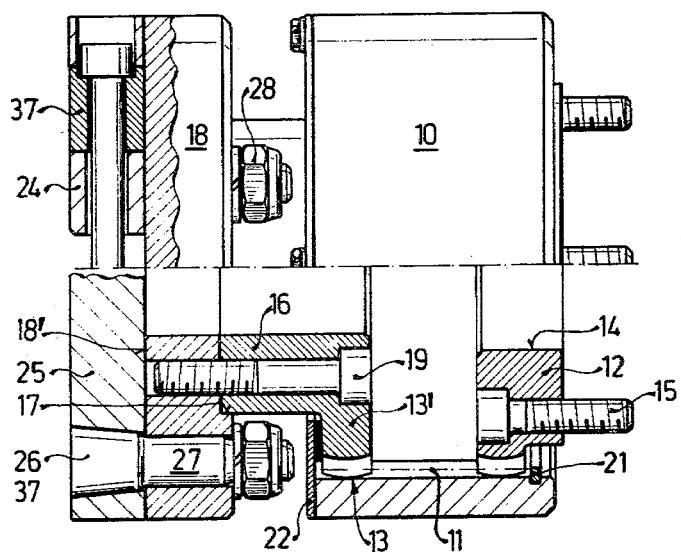
FIG. 2 is a section along II—II of FIG. 1.
Figure 3:
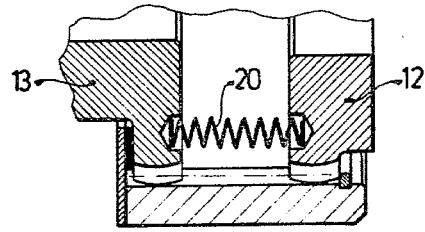
FIG. 3 is an enlarged partial view in section through a part of FIG. 2.

With reference to the drawings it will be seen that a drive bushing 10 of the arcuate gear coupling is provided on its inner wall with a straight toothing 11 with which the arcuate exterior teeth of two spaced ring gears 12 and 13 mesh. The ring gear 12 is formed in about the shape of a disk with a central bore 14 and is connected by means of screws 15, for instance to the flange of a motor.

The ring gear 13 has a flange-like portion 13' carrying the arcuate teeth and an extension 16 the face of which abuts on a matching surface 17 of a disk 18. The disk 18 and the gear ring 13 are firmly interconnected by screws 19. Between the two ring gears compression springs 20 are provided which press the ring gear 12 against the retaining ring 21 and the ring gear 13 against a cover disk 22.

Two segment-like clamp jaws 24 and 25 are secured to the flat front face 18' of the disk. The clamp jaw 25 is screwed by means of a screw 27 to the disk 18. The screw has a conical head 26.

The clamp jaw 24 is connected in similar way by a screw 28 with the disk 18.

The clamp jaws are journalled with only small play on these screws to pivot about the latter. The screws 27, 28 are situated close to the circumference of the jaws and are also situated close to their flat clamping faces.

A gap s is provided between the flat faces of the two clamp jaws 24, 25. This gap forms the so-called clamping area. Connecting pieces 29 and 30 of the driven part extend into this clamping area.

To press the two jaws 24, 25 against each other two tension screws 31, 32 are provided which are disposed in bores 33, 34 and 35, 36. The bores extend through the jaws and are in axial alignment.

In the upper part of the bore 33 a cylindrical pressure washer 37 is provided on which the head 31' of the tension screw 31 rests. In the lower part of the bore 34 there is likewise disposed a cylindrically formed nut 38. The thread 31" of the tension screw 31 screws into this pressure bolt. The screw 32 is arranged in the same manner.

These screws are close to the plane of symmetry of the coupling, that is they are arranged between the screws 27, 28, which form the pivots for the jaws. The two jaws 24, 25 are forced by the screws 31, 32 to move against the connecting pieces 29, 30.

If the tension screws 31, 32 are tightened, the jaws 24 and 25 rotate about the axis of the screws 27, 28. The flat face of the clamp jaw which is opposite to the pivot is thus moved closer to the pivot. In released condition the two clamp jaws are held apart by a compression spring 36 to the extent as the tension screws 31, 32 permit.

As appears particularly from FIG. 1 the lever arm $L_1$ resulting between the connecting piece 29 and the screw 32 is comparatively small. The same is true for the lever arm $L_2$ between the screw 31 and the center of the connecting piece 30.

The forces F act upon the two connecting pieces 29 and 30. Because of the comparatively small length of arms $L_1$ and $L_2$, the bending moments which are exerted upon the clamp jaws are not large. In particular they do not affect the integrity of the jaws since their moment of resistance which is at the top of the segments is large. In other words, the clamp jaws have a high resistance to bending.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In a toothed coupling including a coupling bushing with internal teeth, a first ring gear with convex external teeth in mesh with a portion of the internal teeth of the bushing and a second ring gear with convex external teeth in mesh with another portion of the internal teeth of the bushing, a combination comprising a support disk secured to one of said ring gears, a pair of facing clamp jaws journalled for rotation on said support disk at diametrically opposed pivot points; connecting means disposed between the end portions of said jaws; and tensioning means engaging said jaws between said pivot points for substantially radially forcing said jaws against said connecting means, said tensioning means including aligned bores in said jaws, a rotary washer seated on one jaw in alignment with one of said bores, a rotary nut supported on the other jaw in alignment with the other bore, and a tensioning screw passing through said washer and engaging said nut.

2. The combination of claim 1 wherein the clamp jaws are in the form of generally segmental bodies and wherein the disk has a flat face and wherein screw bolts are provided on said disk face on which the clamp jaws are rotatably disposed with a limited amount of play.

3. The combination of claim 1 wherein the clamp screws are arranged near the plane of symmetry of the clutch.

4. The combination of claim 1 wherein the clamp jaws, when not acted upon, are kept apart by a pressure spring.

* * * * *